United States Patent
Luo

(10) Patent No.: US 7,653,267 B2
(45) Date of Patent: Jan. 26, 2010

(54) ELECTRO-OPTIC MODULATOR WITH ADJUSTABLE CAVITY SIZE

(75) Inventor: Xin Luo, Sunnyvale, CA (US)

(73) Assignee: Newport Corporation, Irvine, CA (US)

( * ) Notice: Subject to any disclaimer, the term of this patent is extended or adjusted under 35 U.S.C. 154(b) by 0 days.

(21) Appl. No.: 11/801,289

(22) Filed: May 9, 2007

(65) Prior Publication Data

US 2007/0263271 A1 Nov. 15, 2007

Related U.S. Application Data

(60) Provisional application No. 60/801,354, filed on May 15, 2006.

(51) Int. Cl.
*G02F 1/035* (2006.01)
(52) U.S. Cl. .................... 385/2; 385/1; 385/3
(58) Field of Classification Search ............... 385/1–3
See application file for complete search history.

(56) References Cited

U.S. PATENT DOCUMENTS

| 5,189,547 | A | 2/1993 | Day et al. | |
|---|---|---|---|---|
| 5,414,552 | A | 5/1995 | Godil | |
| 2006/0082863 | A1* | 4/2006 | Piehl et al. | 359/291 |
| 2006/0092494 | A1 | 5/2006 | Tinoco | |
| 2007/0139755 | A1 | 6/2007 | Arnone et al. | |

OTHER PUBLICATIONS

Timothy Day. *Resonant Modulators Operate Over Wide Frequency Ranges.* Technology Guide: Modulators. Laser Focus World. May 1992. pp. 183-188.
*Practical Uses and Applications of Electro-Optic Modulators.* Application Note 2. New Focus Inc. Copyright 2001.

* cited by examiner

*Primary Examiner*—Frank G Font
*Assistant Examiner*—Eric Wong
(74) *Attorney, Agent, or Firm*—Roeder & Broder LLP

(57) ABSTRACT

A beam modulator (14) for modulating a beam (20) includes a modulator element (26) and a housing assembly (24). The modulator element (26) is positioned in the path of the beam (20). The housing assembly (24) retains the modulator element (26). Additionally, the housing assembly (24) defines a resonant cavity (328) with the modulator element (26) positioned therein. The housing assembly (24) includes a size adjuster (30) that can be moved to selectively adjust the size of the resonant cavity (328). As a result thereof, in certain embodiments, the resonant frequency of the beam modulator (14) can be easily tuned over a relatively large frequency range.

23 Claims, 6 Drawing Sheets

ELECTRO-OPTIC MODULATOR WITH ADJUSTABLE CAVITY SIZE

REFERENCE TO RELATED APPLICATION

This Application claims the benefit on U.S. Provisional Application Ser. No. 60/801,354 filed on May 15, 2006. The contents of U.S. Provisional Application Ser. No. 60/801,354 are incorporated herein by reference.

BACKGROUND

Optical modulators are used to electrically modulate a laser beam from a laser source for optical communication, scientific instruments and other instruments. One type of optical modulator includes a crystal (EO material) and a drive circuit that applies a driving voltage across the crystal. In this design, the laser beam is directed at the crystal. The voltage across the crystal changes the index of refraction of the crystal. The amount in which the index of refraction is changed is proportional to the amount of voltage applied to it. With this design, the crystal changes the optical path length of the laser beam through the crystal in accordance with the frequency of the driving voltage. Thus, a laser beam emerging from the crystal is modulated by the frequency of the driving voltage. The effective voltage applied to the eo crystal can be amplified by placing the eo crystal within a resonant cavity. However, the amplification only occurs at fixed resonant frequencies supported by the fixed cavity dimension. Therefore, most optical modulators with fixed cavity design have a very limited tuning range.

SUMMARY

A beam modulator for modulating a beam having a beam path includes a modulator element and a housing assembly. The modulator element is positioned in the beam path. The housing assembly retains the modulator element. Additionally, the housing assembly defines a resonant cavity with the modulator element positioned therein.

In certain embodiments, the housing assembly includes a size adjuster that is used to selectively adjust the size of the resonant cavity. As a result thereof, in certain embodiments, the resonant frequency of the beam modulator can be easily tuned over a relatively large range, and the same beam modulator can be used for a number of different types of applications.

In one embodiment, the housing assembly includes a housing base that cooperates with the size adjuster to define the resonant cavity. In this embodiment, the size adjuster is moveable relative to the housing base to selectively adjust the size of the resonant cavity. Additionally, the housing assembly can include an adjuster guide that guides the movement of the size adjuster. Further, the modulator element can be retained by the adjuster guide.

Moreover, the housing base can include a base aperture that allows for access to adjust the position of the size adjuster relative to the adjuster guide.

In certain embodiments, the size adjuster can be used to selectively adjust the size of the resonant cavity so that the resonant frequency of the resonant cavity can be adjusted continuously from a few hundreds MHz up to over 10 GHz. In alternative, non-exclusive embodiments, the resonant frequency of the resonant cavity can be adjusted at least approximately 0.5, 1, 1.5, 2, or 2.5 GHZ.

Additionally, the beam modulator can include a modulator circuit that is electrically connected to the modulator element. In this embodiment, the modulator circuit directs a voltage across the modulator element to change an index of refraction of the modulator element.

Moreover, the present invention is directed to a precision apparatus that includes a beam source that generates a beam and the beam modulator positioned in the path of the beam. Further, the present invention is directed to a method for modulating a beam that includes the steps of-positioning a modulator element in a resonant cavity and selectively adjusting the size of the resonant cavity to tune the resonant frequency of the resonant cavity.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
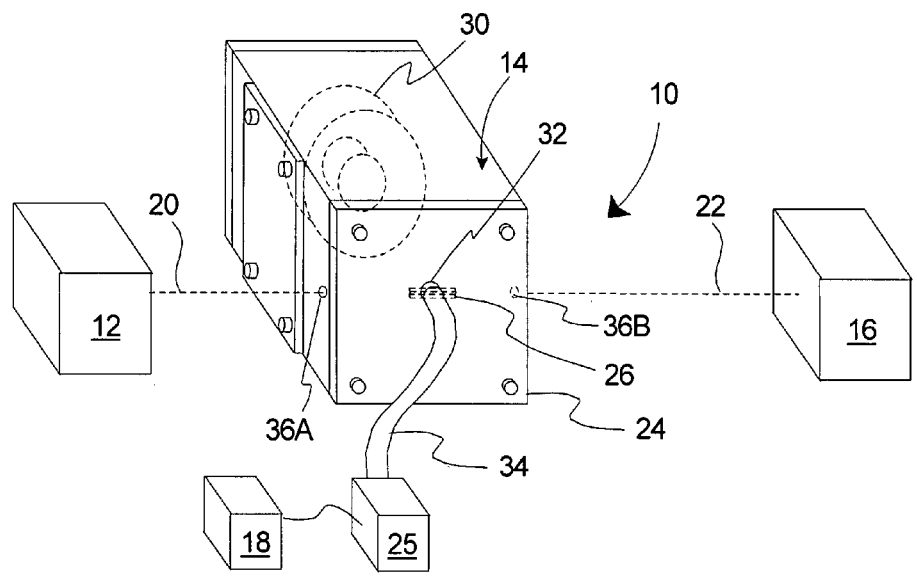
FIG. 1 is a simplified perspective view of a precision apparatus including a beam modulator.

Referring to FIG. 1, the present invention is directed to a precision apparatus 10 that, for example, can be used as or in manufacturing, optical communications, technical or scientific instruments. The design and orientation of the components of the precision apparatus 10 can be changed to suit the requirements of the precision apparatus 10. FIG. 1 is a simplified perspective view of one non-exclusive embodiment of the precision apparatus 10. In this embodiment, the precision apparatus 10 includes a beam source 12, a beam modulator 14, an object 16, and a control system 18. However, one or more of these components can be optional or the position of one or more of these components can be different than that illustrated in FIG. 1.

The beam source 12 generates a beam 20 of light energy that is directed at the beam modulator 14. In one embodiment, the beam source 12 is a laser source and the beam 20 is a small diameter optical beam.

The beam modulator 14 is positioned in the path of the beam 20 and modulates the beam 20. In one embodiment, the beam 20 enters the beam modulator 14 and emerges from the beam modulator 14 as a modulated beam 22 that is directed to the object 16. As non-exclusive examples, the object 16 can be a mirror, lens, telescope, filter, emitter and/or detector.

FIG. 1 illustrates one embodiment of the beam modulator 14. In this embodiment, the beam modulator 14 includes a housing assembly 24, a modulator circuit 25, and a modulator element 26 (illustrated in phantom) that is positioned within the housing assembly 24. The design of each of these components can be modified to suit the design requirements of the beam modulator 14. In FIG. 1, the housing assembly 24 encircles and encloses the modulator element 26 and defines a resonant cavity 328 (illustrated in FIGS. 3A and 3B) that encircles the modulator element 26.

As an overview, in certain embodiments, the housing assembly 24 includes a size adjuster 30 (illustrated in phantom) that can be used to selectively adjust the size of the resonant cavity 328. As a result thereof, in certain embodiments, the resonant frequency of the beam modulator 14 can be easily tuned over a relatively large range by adjusting the size of the resonant cavity 328.

In FIG. 1, the housing assembly 24 includes a housing connector 32 in one wall that allows a connector line 34 to electrically connect the modulator circuit 18 to the modulator element 26. In one embodiment, this is the only electrical connection that is required to drive the modulator element 26.

Additionally, in FIG. 1, the housing assembly 24 includes small optical windows 36A, 36B (one is illustrated in phantom) on opposite sides thereof through which the beam 20, 22 passes and the modulator element 26 is positioned between the windows 36A, 36B. With this design, the beam 20 is directed into the optical window 36A and the modulated beam 22 passes through the optical window 36B. Each window 36A, 36B is made of a material that allows the beam 20, 22 to pass there through. In one embodiment, each window 36A, 36B is made of a substantially transparent material. Alternatively, for example, each window 36A, 36B can be an opening in the housing assembly 24.

The modulator circuit 25 directs a voltage across the modulator element 26 to change and accurately adjust the index of refraction of the modulator element 26. In one embodiment, the modulator circuit 25 directs a fixed frequency sinusoidal voltage waveform of sufficient magnitude across the modulator element 26. The design of the modulator circuit 25 can be varied according to the teachings provided herein. For example, the modulator circuit 25 can include a circuit board (not shown) and a plurality of electrical components (not shown) that are secured or coupled to the circuit board. For example, one or more of the electrical components can be one or more signal source(s), resistor(s), and/or inductor(s).

In FIG. 1, the modulator circuit 25 is illustrated as being positioned outside of and away from the housing assembly 24. Alternatively, for example, the modulator circuit 25 can be position by or within the housing assembly 24.

The control system 18 directs a voltage to the modulator circuit 25. In one embodiment, the control system 18 includes a signal generator (not shown) that provides a low voltage signal to the modulator circuit 25. In one, non-exclusive embodiment, the control system 18 provides a sine wave with a frequency of between approximately 100 MHz and 10 GHz to the modulator circuit 25. It should be noted that the frequencies are not really limited to any design, rather than materials and availability of parts. Accordingly, the control system 18 can provide a voltage and/or frequency of greater or lesser than these amounts.

The control system 18 can include a low power oscillator circuits (generating low power RF of given frequencies, and can be tunable). The modulator circuit 25 can include a RF power amp that amplifies the low power oscillator signal to sufficient power to drive the resonant eom. The resonant design reduces RF power requirement for the modulator circuit 25.

The control system 18 can also control the operation of one or more of the other components of the precision apparatus 10. The control system 18 can include one or more processors. In FIG. 1, the control system 18 is positioned away from the other components of the apparatus 10. Alternatively, the control system 18 can be incorporated partly or fully into one of the components of the apparatus 10.

Figure 2:
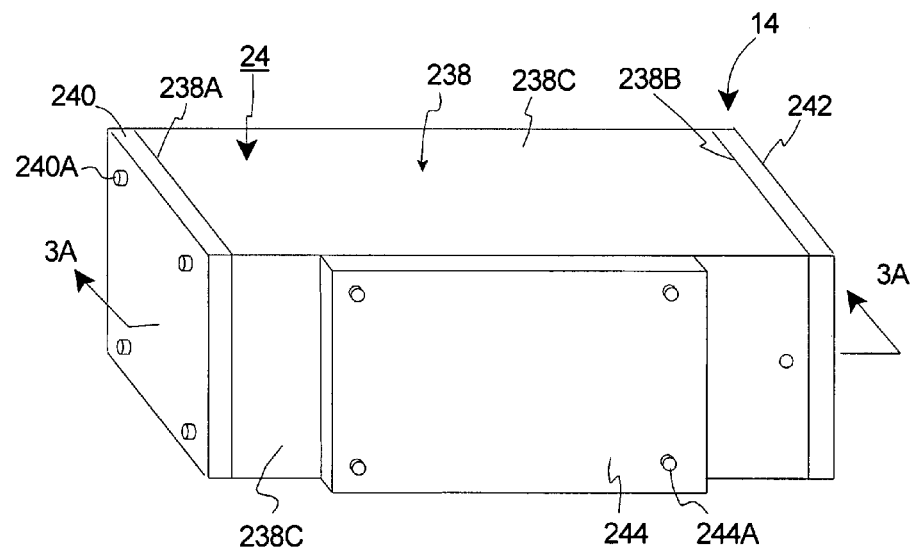
FIG. 2 is a simplified perspective view of the beam modulator of FIG. 1.

FIG. 2 is an enlarged perspective view of the beam modulator 14 including the housing assembly 24. The design of the housing assembly 24 can vary pursuant to the teachings provided herein. In one embodiment, the housing assembly 24 includes a housing base 238, a removable first end wall 240, a removable second end wall 242, and a removable side wall 244. In FIG. 2, the housing base 238 is generally rectangular tube shaped and includes an open first housing end 238A, an open second housing end 238B that is opposite the first housing end 238A, and four housing sides 238C.

Further, in FIG. 2, the first end wall 240, the second end wall 242, and the side wall 244 are each generally rectangular plate shaped. In this embodiment, (i) the first end wall 240 is selectively secured to the first housing end 238A of the housing base 238 with a fastener assembly 240A, (ii) the second end wall 242 is selectively secured to the second housing end 238B of the housing base 238 with a fastener assembly 442A (illustrated in FIG. 4), and (iii) the side wall 244 is selectively secured to one of the housing sides 238C of the housing base 238 with a fastener assembly 244A. Each fastener assembly 240A, 442A, 244A, for example, can include one or more bolts, threaded rods and corresponding nuts, clamps, and/or an adhesive. In FIG. 2, each fastener assembly 240A, 442A, 244A includes four bolts that extend through the respective wall 240, 242, 244, and thread into the housing base 238.

Alternatively, the housing base 238, and/or one or more of the walls 240, 242, 244 can have a different configuration than that illustrated in FIG. 2. Still alternatively, the housing assembly 24 can be designed without one or more to the walls 240, 242, 244 illustrated in FIG. 2.

In one embodiment, the housing base 238, and/or one or more of the walls 240, 242, 244 are made of highly conductive materials, such as copper or aluminum, and/or are plated with highly conductive materials.

Figure 3A:
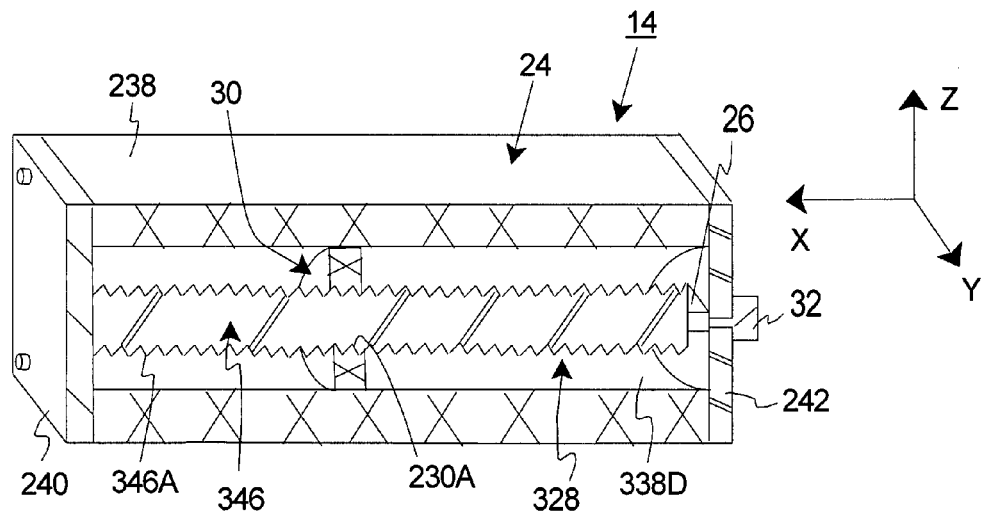
FIG. 3A is a perspective cut-away view of the beam modulator taken on line 3A-3A of FIG. 2.

FIG. 3A is a perspective cut-away view taken on line 3A-3A of FIG. 2 that illustrates some of the components of the beam modulator 14 in more detail. For example, FIG. 3A illustrates the modulator element 26, the housing assembly 24, and the resonant cavity 328 in more detail.

In one embodiment, the modulator element 26 is made of a material having an index of refraction that changes when a voltage is applied across the modulator element 26. With this design, the voltage across the modulator element 26 changes the phase of the beam 20 (illustrated in FIG. 1) that passes through the modulator element 26. For example, the modulator element 26 can be made of a crystal material, such as lithium niabate or lithium tantalate. Other non-exclusive examples of materials for the modulator element 26 can include KTP, KD*P, RTP, RTA, BBO, LBO crystals, some glass materials, some semicondutors, and some polymers. The present invention is rather generic with respecting to type of material utilized for the modulator element 26.

In one embodiment, the modulator element 26 is generally rectangular shaped. Alternatively, the modulator element 26 can have a different shape and/or configuration. One or both of the ends of the modulator element 26 can be coated with an anti-reflection coating.

In FIG. 3A, the modulator element 26 is electrically connected to the modulator circuit 25 (illustrated in FIG. 1) via the housing connector 32.

FIG. 3A also illustrates the size adjuster 30 in more detail. As discussed above, the size adjuster 30 can be used to selectively adjust the size of the resonant cavity 328. As a result thereof, in certain embodiments, the resonant frequency of the beam modulator 14 can be easily tuned over a relatively large range. The design of the size adjuster 30 can be varied to achieve the desired performance of the beam modulator 14. In FIG. 3A, the size adjuster 30 is a wall that can be selectively moved relative to the rest of the housing assembly 24 to adjust the size of the resonant cavity 328. More specifically, in FIG. 3A, the size adjuster 30 is an annular shaped ring that includes an internally threaded surface 330A. Alternatively, the size adjuster 30 can have another shape or configuration.

Additionally, FIG. 3A illustrates that the housing assembly 24 can include an adjuster guide 346 that retains and guides the movement of the size adjuster 30. The design of the adjuster guide 346 can be varied to achieve the desired ease of movement of the size adjuster 30. In FIG. 3A, the adjuster guide 346 is a generally right cylindrical shaft that extends away from and is fixedly secured to the first end wall 240. Moreover, in FIG. 3A, the adjuster guide 346 can include an externally threaded surface 346A that engages the internally threaded surface 330A of the size adjuster 30.

With the design illustrated in FIG. 3A, rotation of the size adjuster 30 in one rotational direction causes the size adjuster 30 to move in one direction along the X axis relative to the adjuster guide 346, the modulator element 26, and the rest of the housing assembly 24. Further, rotation of the size adjuster 30 in the opposite rotational direction causes the size adjuster 30 to move in opposite direction along the X axis relative to the adjuster guide 346, the modulator element 26, and the rest of the housing assembly 24. As a result thereof, the size of the resonant cavity 328 can be easily and precisely adjusted and changed.

In alternative, non-exclusive embodiments, the size adjuster 30 can be moved approximately 10, 20, 40, 50, 80 or 100 millimeters along the X axis or any amount therebetween. Alternatively, the device could be designed to have a larger or small range of movement of the size adjuster 30.

In one embodiment, the size adjuster 30, and/or the adjuster guide 346 are made of highly conductive materials, such as copper or aluminum, and/or are plated with highly conductive materials. In certain embodiments, the size adjuster 30 maintains electrical conduction and is in electrical communication with the rest of the housing assembly 24 as the size adjuster 30 is moved relative to the rest of the housing assembly 24 and the size of the resonant cavity 328 is adjusted.

FIG. 3A also illustrates that in one embodiment, the housing base 238 defines a generally cylindrical shaped housing opening 338D that defines a portion of the cavity 328. Alternatively, the housing opening 338D can have another configuration.

In one embodiment, the modulator element 26 is retained between the second end wall 242 and the end of the adjuster guide 346. In this embodiment, the modulator element 26 can be soldered to the housing connector 32 and the adjuster guide 346. Alternatively, the modulator element 26 can be retained in another fashion.

In FIG. 3A, the housing base 238 cooperates with the second end wall 242, the adjuster guide 346, and the size adjuster 30 to define the resonant cavity 328 that encircles and encloses the modulator element 26. In FIG. 3A, the resonant cavity 328 is a generally toroid shaped cavity. Alternatively, the resonant cavity 328 can have a different configuration.

Figure 3B:
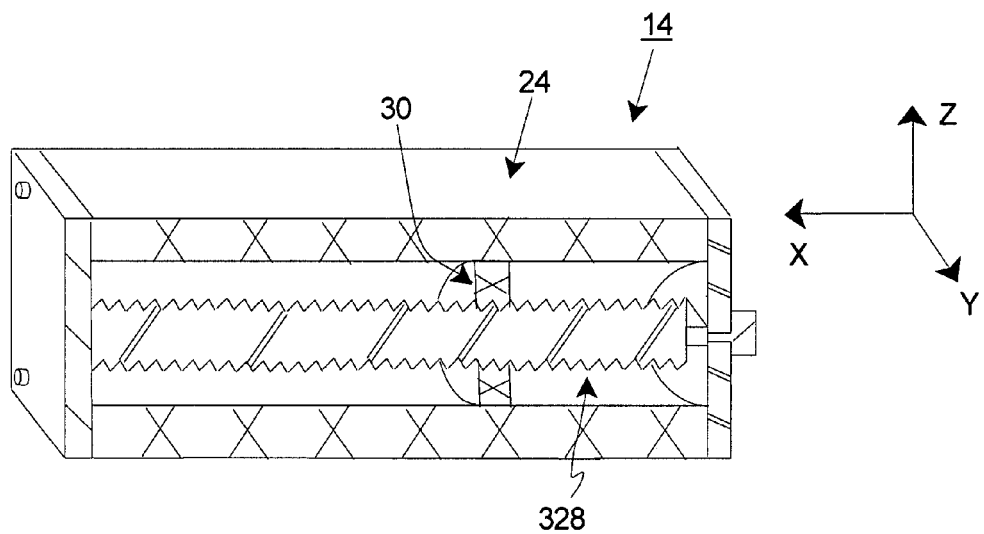
FIG. 3B is an alternative, perspective cut-away view of the beam modulator.

FIG. 3B is an alternative, perspective cut-away view of the beam modulator 14 with the size adjuster 30 in a different position along the X axis than that illustrated in FIG. 3A. As a result thereof, the size of the resonant cavity 328 in FIG. 3B is different than the size of the resonant cavity 328 in FIG. 3A. For convenience, the size adjuster 30 is said to be in a first position in FIG. 3A and the size adjuster 30 is said to be in a second position in FIG. 3B that is different than the first position. It should be noted that the size adjuster 30 can be moved to may different positions than those illustrated in FIGS. 3A and 3B.

In certain embodiments, the size adjuster 30 can be used to selectively adjust the size of the resonant cavity 328 so that the resonant frequency of the resonant cavity 328 can be adjusted continuously from a few hundreds MHz up to over 10 GHz. In alternative, non-exclusive embodiments, the size adjuster 30 can be moved to selectively adjust the size of the resonant cavity 328 so that the resonant frequency of the resonant cavity 328 can be adjusted and/or changed over a relatively wide range, e.g. at least approximately 0.5, 1, 1.5, 2, 2.5, 5, or 10 GHZ. Stated in still another fashion, in alternative, non-exclusive embodiments, the size adjuster 30 can be moved so that the beam modulator 14 can be tuned to have a resonant frequency of between approximately (i) 0.1 to 10 GHz; (ii) 0.5 to 2 GHz; or (iii) 1 to 2 GHz.

In one embodiment, the overall cavity 328 size determines the lowest resonant frequency (e.g. a few hundreds MHz, or lower if necessary). By adjusting the size of the cavity 328 with the cavity adjuster 30 (side to side or from bottom to top where the modulator element 26 is mounted), the size of the cavity 328 can be effectively adjusted. This way the resonant frequencies of the cavity 328 can be adjusted relatively easily. The upper limit of resonant frequencies is determined by size of modulator element 26 used and lateral size of the cavity 328. In certain embodiments, the practical limit is about 10 GHz. The present design allows higher frequencies if a small (hard to use) modulator element 26 is installed in cavity 30.

It should be noted that to achieve a relatively large (and usable) amount of modulation with the modulator element 26, high electrical potential is required. The modulator element 26 typically behaves as a capacitive load. Driving a capacitive load at high modulation frequency, and large amplitude (a few hundred of volts) presents a challenge for the modulator circuit 25 (illustrated in FIG. 1). However, because the modulator element 26 in positioned in the resonant cavity 328, the driving voltage can be reduced. More specifically, the resonant cavity 328 stores the electrical energy and allows high voltage to build up across the modulator element 26. The dimensions of the resonant cavity 328 determine the resonant frequencies that the resonant cavity 328 can support. With the present, the size adjuster 30 can be moved to precisely adjust the discrete resonant frequencies that can be supported by the resonant cavity 328.

The required level of modulation required by the beam modulator 14 will depend upon the design and use of the precision apparatus 10 (illustrated in FIG. 1). With the present design, in certain embodiments, the size adjuster 30 can be moved to adjust the resonant frequency over a relative large range. As a result thereof, the beam modulator 14 can be used for many different applications and many different types of precision apparatuses 10.

Figure 4:
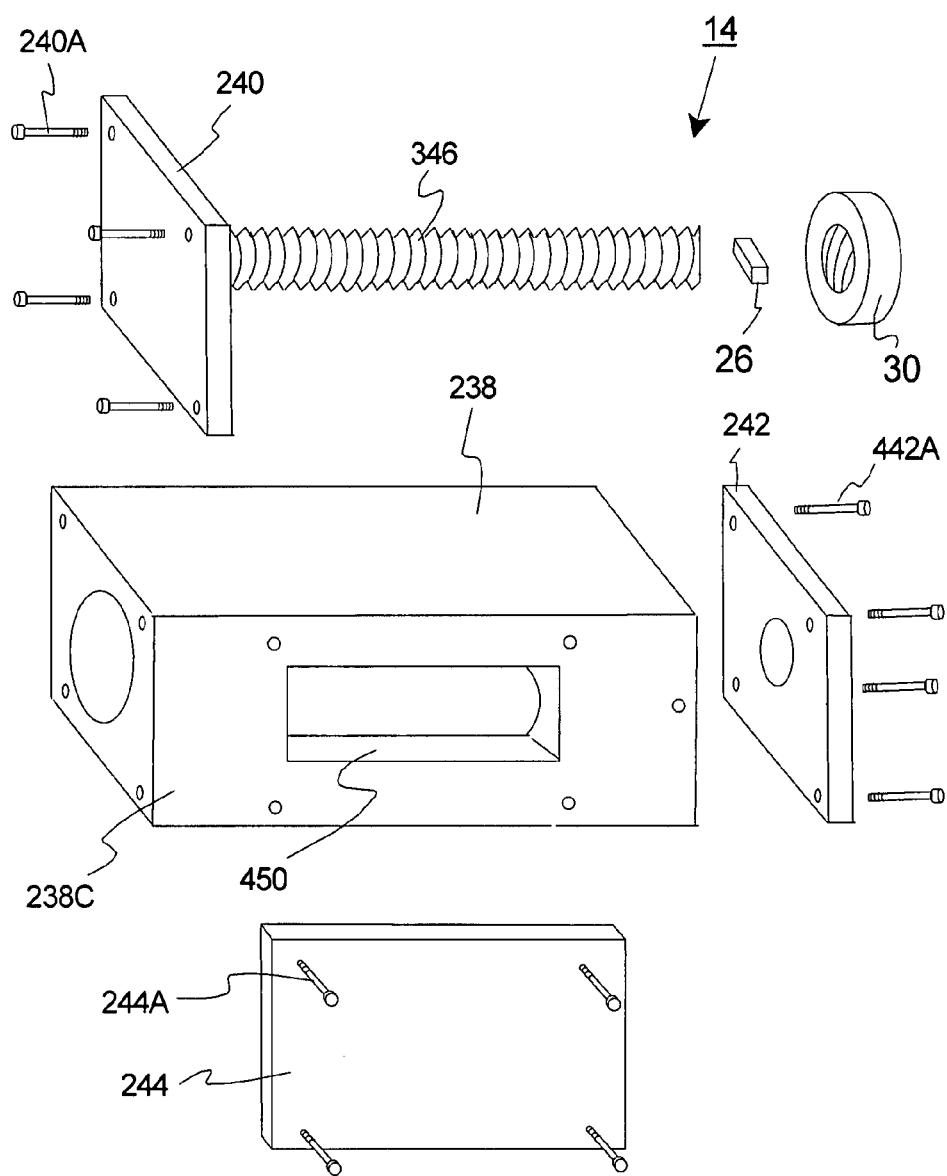
FIG. 4 is an exploded perspective view of the beam modulator of FIG. 2.

FIG. 4 is an exploded perspective view of a portion of the beam modulator 14 including the housing base 238, the size adjuster 30, the adjuster guide 346, the modulator element 26, the walls 240, 242, 244, and the fastener assemblies 240A, 442A, 244A in more detail. FIG. 4 also illustrates that the housing base 238 can include a base aperture 450 that allows for access to the size adjuster 30 to move the size adjuster 30 within the resonant cavity 328 (illustrated in FIGS. 3A and 3B). In FIG. 4, the base aperture 450 is rectangular shaped and extends through on the housing sides 238C. Alternatively, the base aperture 450 can have another shape or be positioned in another location.

Figure 5:
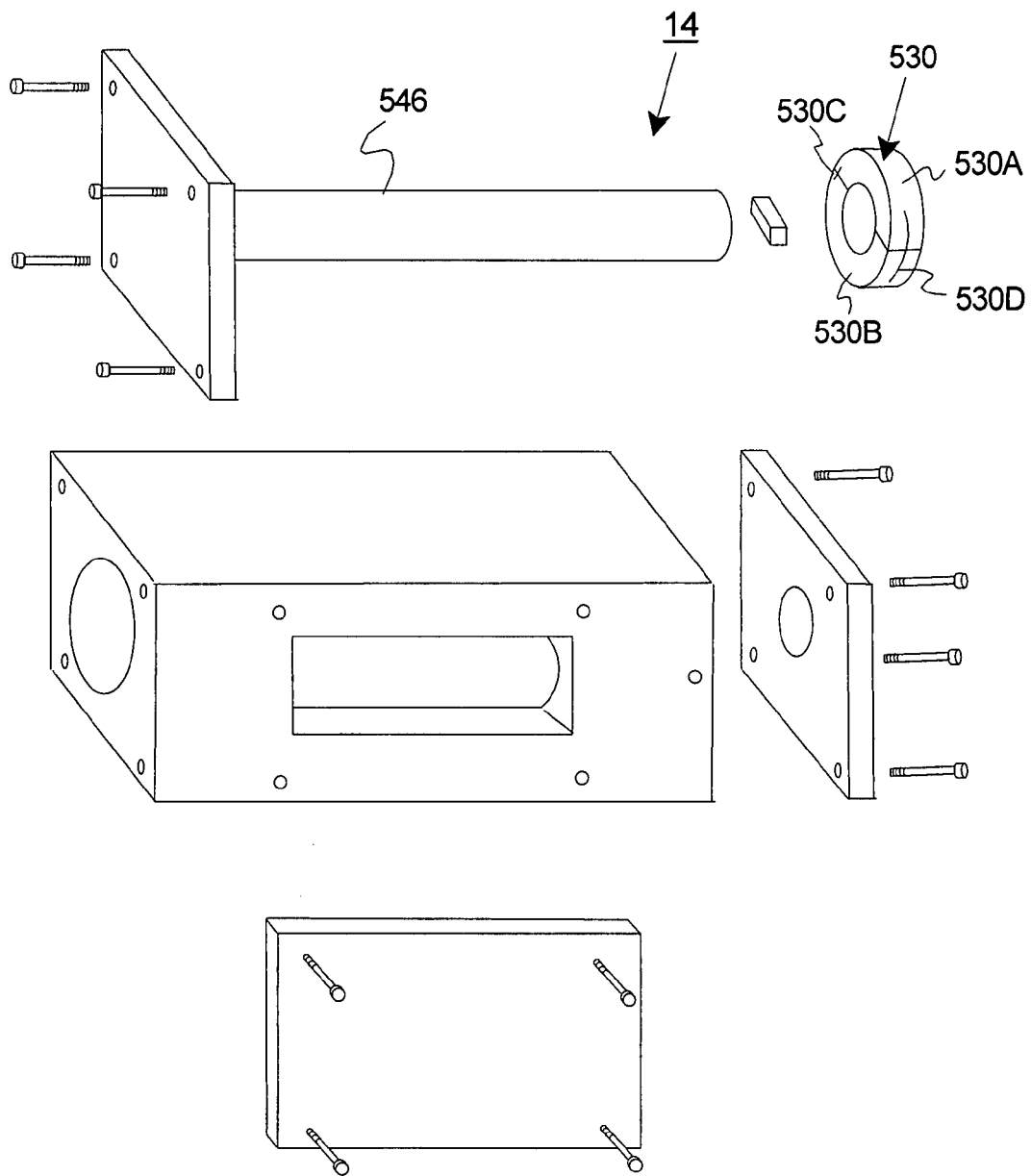
FIG. 5 is an exploded perspective view of another embodiment of the beam modulator.

FIG. 5 is an exploded perspective view of another embodiment of the beam modulator 514 that is somewhat similar to the corresponding apparatus described above. However, in FIG. 5, the adjuster guide 546 and the size adjuster 530 are slightly different. More specifically, in this embodiment, the adjuster guide 546 is a generally cylindrical shaft and the size adjuster 530 is an annular ring. Further, the size adjuster 530 is split and includes an arch shaped first segment 530A, an arch shaped second segment 530B, a hinge 530C that pivotable connects the segments 530A, 530B together, and a clamp 530D that selectively secures the segments 530A, 530B together. In this embodiment, when the clamp 520D is unclamped, the size adjuster 530 can be slid along the adjuster guide 546 to adjust the resonant cavity 328 (illustrated in FIGS. 3A and 3B) size. Alternatively, when the clamp 520D is locked, the size adjuster 530 is inhibited from being moved along the adjuster guide 546. With this design, the size of the resonant cavity 328 can be easily adjusted.

Figure 6:
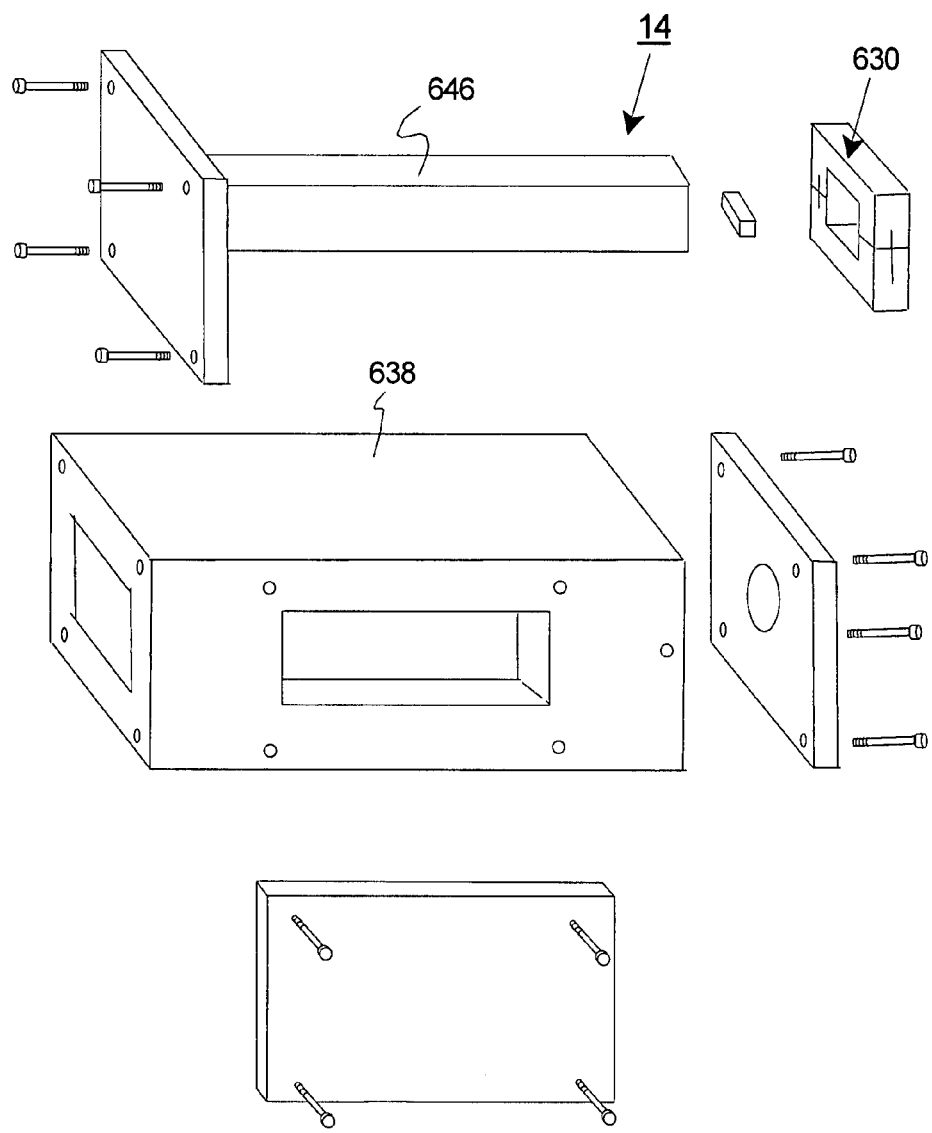
FIG. 6 is an exploded perspective view of still another embodiment of the beam modulator.

FIG. 6 is an exploded perspective view of still another embodiment of the beam modulator 614 that is somewhat similar to the corresponding apparatuses described above. However, in FIG. 6, the housing base 638, the adjuster guide 646 and the size adjuster 630 are slightly different. More specifically, in this embodiment, the opening in the housing base 638 is generally rectangular shaped, the adjuster guide 646 is a generally rectangular shaft shaped, and the size adjuster 630 is rectangular tube shaped.

Figure 7:
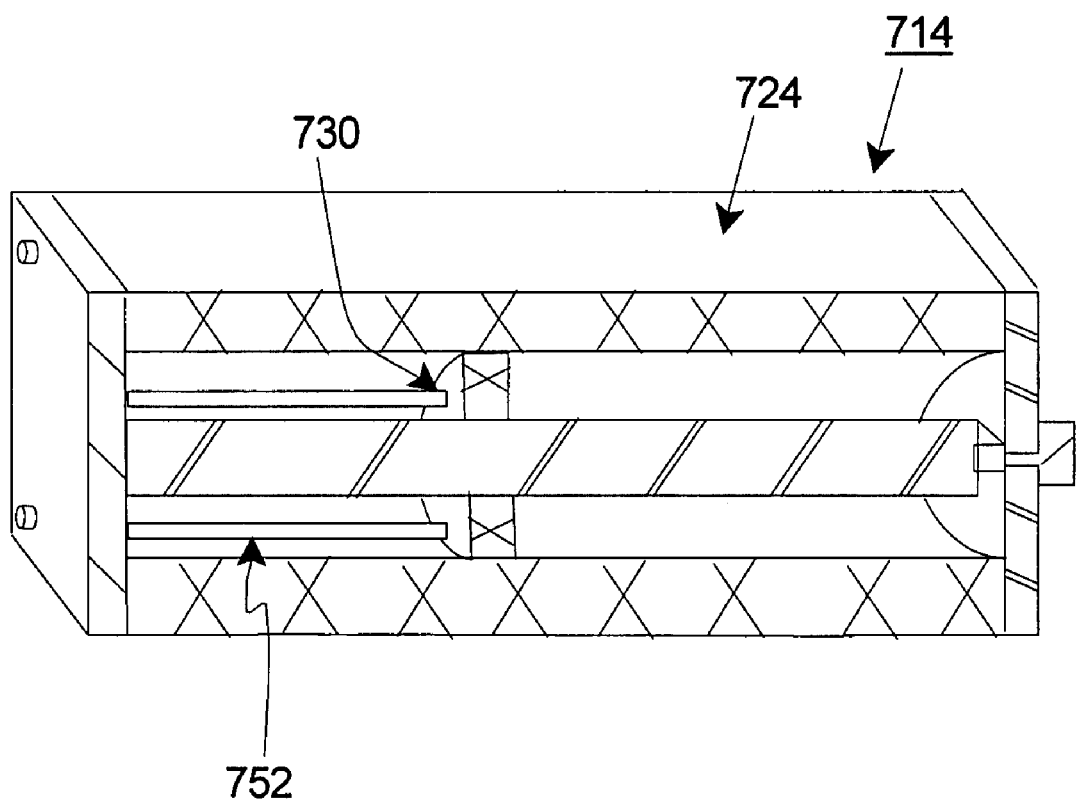
FIG. 7 is perspective cut-away view of yet another embodiment of a beam modulator.

FIG. 7 is perspective cut-away view of yet another embodiment of a beam modulator 710 that is somewhat similar to the corresponding apparatuses described above. However, in FIG. 7, the size adjuster 730 is moved in a different fashion. More specifically, in this embodiment beam modulator 710 can include an adjuster mover assembly 752 that moves the size adjuster 730 relative to the rest of the housing assembly 724. For example, the adjuster mover assembly 752 can include one or more linear motors or piezoelectric actuators that can be controlled to precisely position the size adjuster 730.

While the particular apparatus 10 as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A beam modulator for modulating a beam having a beam path, the beam modulator comprising:
    a modulator element that is positioned in the beam path; and
    a housing assembly that defines a resonant cavity with the modulator element positioned therein, the housing assembly including a size adjuster that can be used to selectively adjust the size of the resonant cavity without moving the modulator element.

2. The beam modulator of claim 1 wherein the housing assembly includes a housing base that cooperates with the size adjuster to define the resonant cavity, and wherein the size adjuster is moveable relative to the housing base to selectively adjust the size of the resonant cavity.

3. The beam modulator of claim 2 wherein the housing assembly includes an adjuster guide that guides the movement of the size adjuster.

4. The beam modulator of claim 3 wherein the modulator element is retained by the adjuster guide.

5. The beam modulator of claim 3 wherein the housing base includes a base aperture that allows for access to adjust the position of the size adjuster relative to the adjuster guide.

6. The beam modulator of claim 1 wherein size adjuster can be used to selectively adjust the size of the resonant cavity so that the resonant frequency of the resonant cavity can be adjusted at least approximately 0.5 GHZ.

7. The beam modulator of claim 1 wherein size adjuster can be used to selectively adjust the size of the resonant cavity so that the resonant frequency of the resonant cavity can be adjusted at least approximately 1 GHZ.

8. The beam modulator of claim 1 further comprising a modulator circuit that is electrically connected to the modulator element, the modulator circuit directing a voltage across the modulator element to change an index of refraction of the modulator element.

9. A precision apparatus including a beam source that generates a beam and the beam modulator of claim 1 positioned in the path of the beam.

10. A beam modulator for modulating a beam having a beam path, the beam modulator comprising:
    a modulator element that is positioned in the beam path;
    a modulator circuit that is electrically connected to the modulator element, the modulator circuit directing a voltage across the modulator element to change an index of refraction of the modulator element and to change the phase of the beam that passes through the modulator element; and
    a housing assembly that retains the modulator element and that defines a resonant cavity with the modulator element positioned therein, the housing assembly including a housing base and a size adjuster that can be moved relative to the housing base to selectively adjust the size of the resonant cavity;
    wherein the voltage across the modulator element does not move the size adjuster.

11. The beam modulator of claim 10 wherein the housing assembly includes an adjuster guide that guides the movement of the size adjuster.

12. The beam modulator of claim 10 wherein the housing base includes a base aperture that allows for access to adjust the position of the size adjuster relative to the adjuster guide.

13. The beam modulator of claim 10 wherein size adjuster can be used to selectively adjust the size of the resonant cavity so that the resonant frequency of the resonant cavity can be adjusted at least approximately 0.5 GHZ.

14. The beam modulator of claim 10 wherein size adjuster can be used to selectively adjust the size of the resonant cavity so that the resonant frequency of the resonant cavity can be adjusted at least approximately 1 GHZ.

15. A precision apparatus including a beam source that generates a beam and the beam modulator of claim 10 positioned in the path of the beam.

16. A method for modulating a beam, the method comprising the steps of:
    positioning a modulator element in a resonant cavity; and
    selectively adjusting the size of the resonant cavity to tune the resonant frequency of the resonant cavity without moving the modulator element.

17. The method of claim 16 wherein the step of positioning includes the steps of providing a housing assembly that includes a housing base and a size adjuster, and wherein the step of selectively adjusting includes the step of moving the size adjuster relative to the rest of the housing base.

18. The method of claim 17 wherein the step of selectively adjusting the size includes adjusting the size so that the resonant frequency of the resonant cavity is adjusted at least approximately 0.5 GHZ.

19. The method of claim 17 wherein the step of selectively adjusting the size includes adjusting the size so that the resonant frequency of the resonant cavity is adjusted at least approximately 1 GHZ.

20. The beam modulator of claim 1 wherein at least a portion of the modulator element is spaced apart from the housing assembly.

21. The beam modulator of claim 1 wherein the modulator element changes the phase of the beam that passes through the modulator element.

22. The beam modulator of claim 10 wherein at least a portion of the modulator element is spaced apart from the housing assembly.

23. A beam modulator for modulating a beam having a beam path, the beam modulator comprising:

a modulator element that is positioned in the beam path;

a modulator circuit that is electrically connected to the modulator element, the modulator circuit directing a voltage across the modulator element to change an index of refraction of the modulator element and to change the phase of the beam that passes through the modulator element; and a housing assembly that retains the modulator element and that defines a resonant cavity with the modulator element positioned therein, the housing assembly including a housing base and a size adjuster that can be moved relative to the housing base to selectively adjust the size of the resonant cavity;

wherein the size adjuster can selectively adjust the size of the resonant cavity without moving the modulator element.

* * * * *